Figure 3:
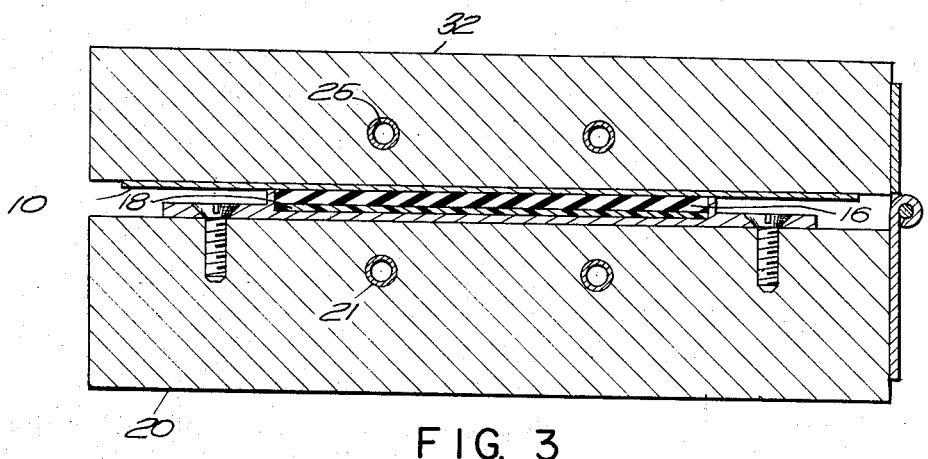

March 12, 1968  R. E. KING  3,372,415
SHOE FORMING METHOD AND APPARATUS
Filed Jan. 23, 1964  3 Sheets-Sheet 1
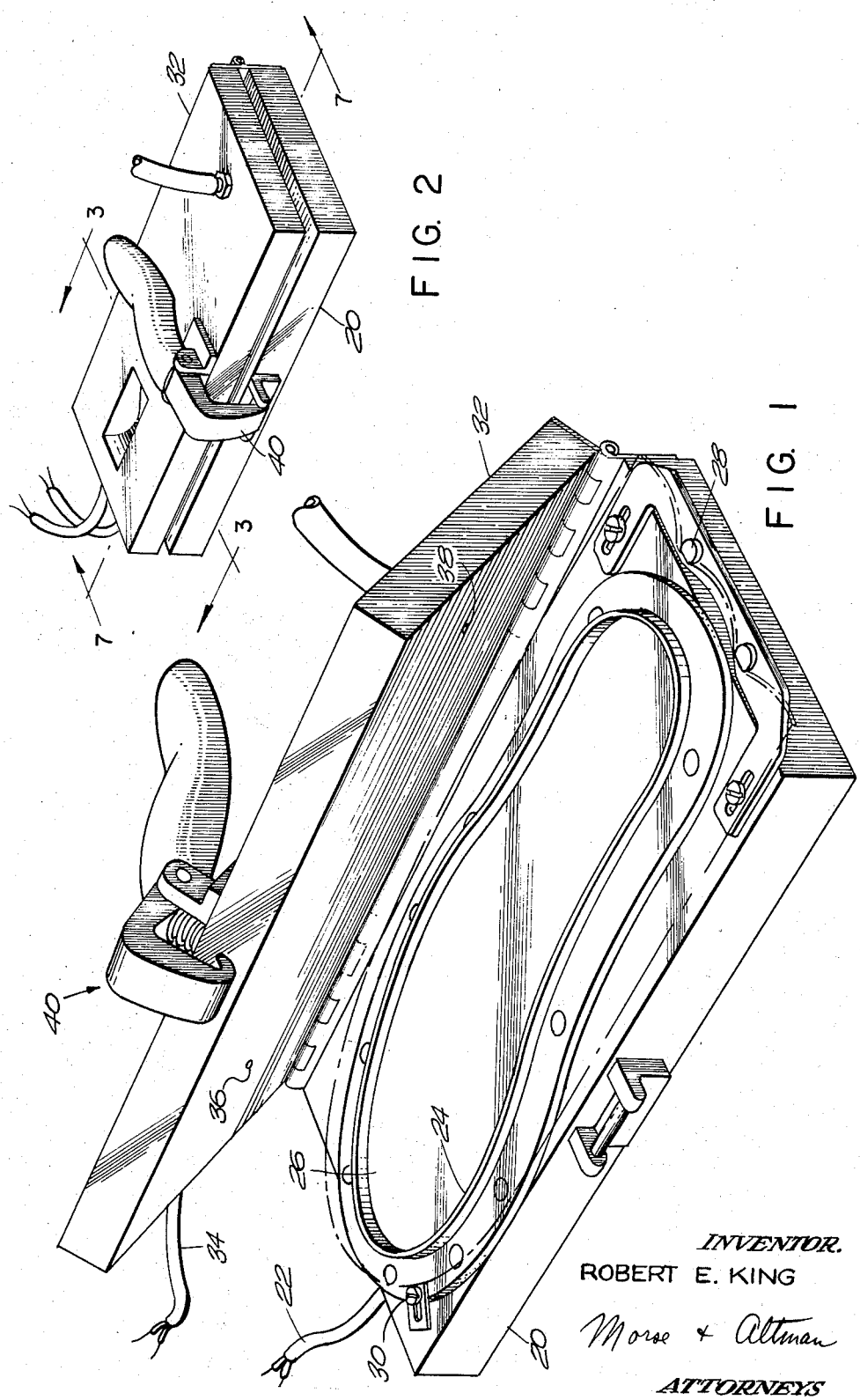
INVENTOR.
ROBERT E. KING
Morse & Altman
ATTORNEYS March 12, 1968   R. E. KING   3,372,415
SHOE FORMING METHOD AND APPARATUS
Filed Jan. 23, 1964   3 Sheets-Sheet 2

INVENTOR.
ROBERT E. KING
BY Morse + Altman
ATTORNEYS

March 12, 1968  R. E. KING  3,372,415
SHOE FORMING METHOD AND APPARATUS
Filed Jan. 23, 1964  3 Sheets-Sheet 3

INVENTOR.
ROBERT E. KING
BY *Morse + Altman*
ATTORNEYS

United States Patent Office 3,372,415
Patented Mar. 12, 1968

3,372,415
SHOE FORMING METHOD AND APPARATUS
Robert E. King, 104 Elm St., Georgetown, Mass. 01830
Filed Jan. 23, 1964, Ser. No. 339,745
3 Claims. (Cl. 12—142)

This invention relates generally to the manufacture of shoes and more particularly is directed towards a new and improved method and apparatus for manufacturing molded sole shoes.

In the manufacturing of shoes, particularly those in which the sole is molded directly to the upper, prior practice has been first to form the upper on the last and thereupon apply the sole to the upper by injection molding, cementing or other suitable techniques. While this method has been practiced for many years, it requires a relatively large capital investment because of the high cost of the last which must be available in large numbers and in a wide variety of sizes in order to produce shoes on a mass production basis. These high manufacturing costs are, of course, reflected in the selling price of the finished shoe. In addition, the molding equipment employed in this field heretofore has been specialized machinery and molds which are quite expensive.

It is an object of the present invention to provide improvements in the manufacturing of shoes having soles molded directly to the uppers.

Another object of this invention is to provide a novel, low-cost and simple method for manufacturing shoes having molded soles.

Still another object of this invention is to provide a shoe forming method and apparatus requiring a low capital investment and yet capable of producing quality shoes on a mass production basis and at a low cost.

More particularly, this invention features a method of manufacturing shoes comprising the steps of forming a flat upper blank, bonding an elastomeric sole to a predetermined selected sole area of the upper blank while the blank is maintained in a flat condition, and finally forming up the free edges of the blank into a three-dimensional contoured shoe upper. As another feature of this invention, a sole is molded to the upper by an injection molding process wherein a liquid plastic resin is injected through a hole formed in one portion of the flat upper into a die cavity which is vented through a hole formed through another portion of the flat upper. Sufficient heat is applied to the die to convert the liquid resin to an elastomeric compound. When the uppers have been formed into shape, a sock liner is applied over the insole so that the shoe has no rough or uneven surfaces but rather presents a smooth, finished appearance both inside and out.

As an alternative method, a pre-formed elastomeric sole is applied to a flat, pre-cut upper by a bonding technique in which sole elements and the flat blank upper are overlaid in their proper relation and thermally bonded so that the several parts are intimately united. The upper portion is then shaped and sewn into a finished shoe without the use of the conventional last.

Figure 4:
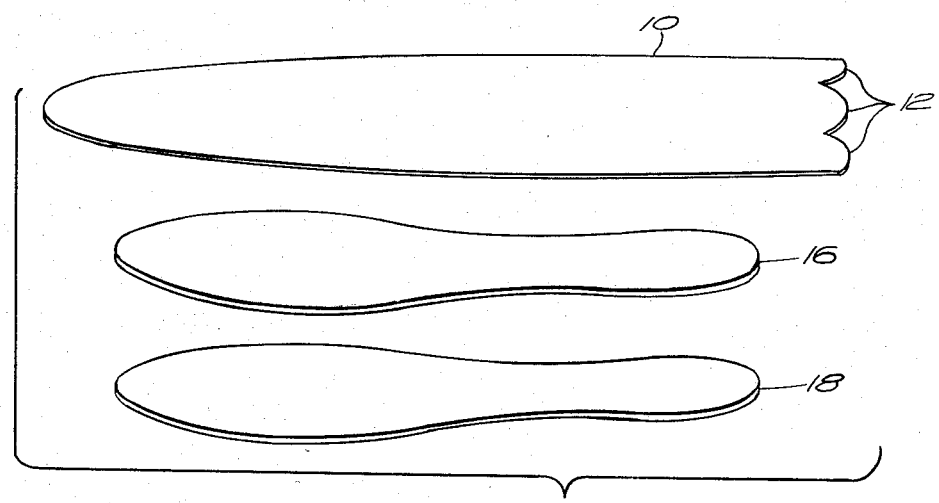
Figure 5:
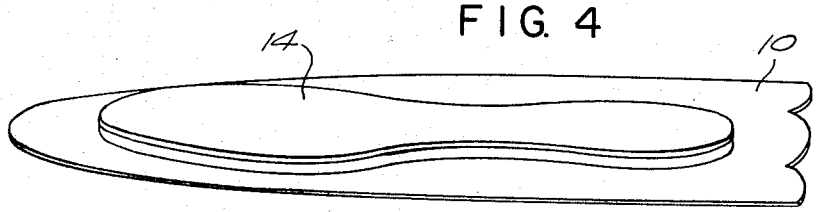
Figure 6:
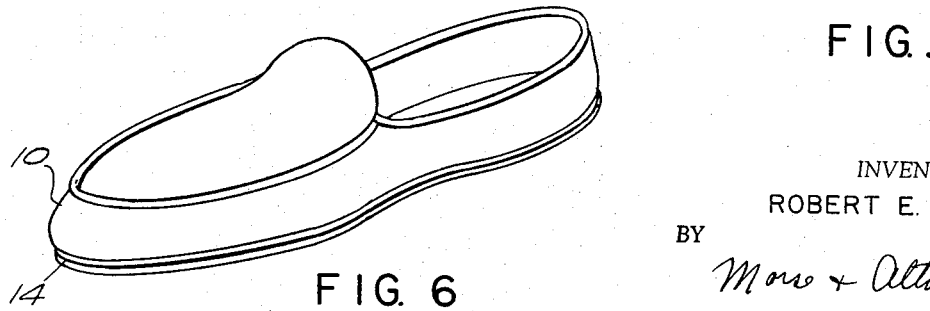
Figure 7:
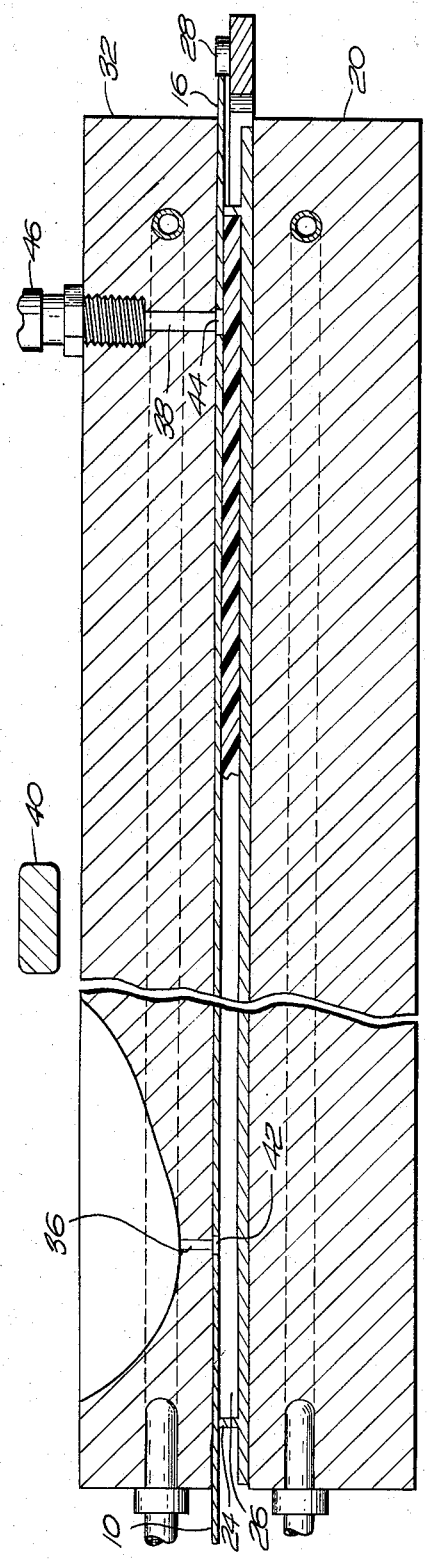
Figure 8:
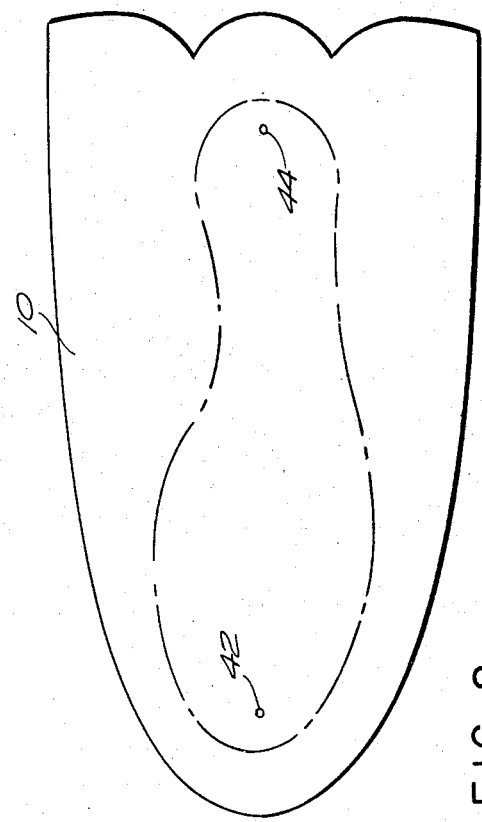

But these and other features of the invention, along with further objects and advantages thereof, will become more fully apparent from the following detailed description of the invention, with reference being made to the accompanying drawings, in which:

FIG. 1 is a view in perspective showing a device for bonding an elastomeric sole to a shoe upper, FIG. 2 is a view similar to FIG. 1 but showing the device in a closed position, FIG. 3 is a cross-sectional view taken along the lines 3—3 of FIG. 2, FIG. 4 is an exploded perspective showing the several shoe parts, FIG. 5 is a view in perspective showing a blank upper in flat form with the sole bonded thereto, FIG. 6 is a view similar to the FIG. 5 but showing the uppers formed into a finished shoe, FIG. 7 is a cross-sectional view taken along lines 7—7 of FIG. 2 and showing the apparatus for producing shoes by a novel injection molding technique, and, FIG. 8 is a top plan view of a blank shoe upper for use in applying the sole by injection molding.

In the practice of this invention, a blank shoe upper 10, typically die cut from a sheet of a tough woven fabric, is provided in flat form and characterized by a generally oval configuration, one end of which is formed with three ear like protrusions 12. While the blank upper 10 is maintained in a flat open condition, a sole 14 of elastomeric material is molded centrally to the outer or wearing surface of the blank 10. In the preferred embodiment of the invention, the sole 14 comprises a pre-cut stratum 16 of sponge rubber and a pre-cut wearing sole 18 of a tough material such as cellular crepe rubber, fabric, leather, or the like. The composite blank 10 sponge rubber stratum 16 and wearing surface 18 are bonded together in a flat open condition by means of a heat sealing process with the several parts held in flat super-imposed relation. The application of heat to the composite members causes an intimate bonding between the several parts with the sponge rubber stratum 16 adhering firmly to the wearing surface 18 and to the blank upper 10 to produce the flat semi-finished shoe shown in FIG. 5. Once the sole has been applied by this process, the free marginal edges of the upper are folded up and sewn into a finished shoe with the ear like protrusions 12 being folded and sewn to form the heel portion. The toe portion of the upper may be folded over and sewn to form a moccasin type shoe as desired. The resulting finished shoe is of the slipper type.

Referring more particularly to FIGS. 1 through 3, there is illustrated a press for use in molding a pre-cut blank upper to a pre-cut elastomeric sole in a flat condition. The press includes a generally flat platen 20 of a suitable metal such as iron, steel, aluminum or the like and in which are mounted heating elements 21 energized by leads 22. Attached to the flat upper surface of the platen is a molding die 24 defining a central cavity 26 conforming in depth and outline to the sole 14. The upper surface of the die 24 is flat and provides a marginal support for the upper blank 10 applied thereto. Adjustable heel and toe positioning shoulders 28 and 30 are mounted on the platen for positioning a flat upper blank 10 precisely with respect to the die 24. A cover plate 32 is hinged to the platen 20 and is also provided with heating elements 25 energized through leads 34. The cover plate may also be formed with openings 36 and 38 located oppositely the toe and heel portions respectively for reasons that will presently appear. A clamping mechanism 40 is employed for holding the cover 32 tightly against the platen 20 during a molding operation.

In practice, the sole components, which in the principal embodiment comprise a pre-cut wearing sole 18 and a pre-cut stratum 16, are placed in the die cavity 26 with the wearing surface 18 on the bottom. A pre-cut upper blank 10 is then superimposed on the sole components and rests on top of the die with the edges butting against the positioning shoulders 28 and 30. If the upper 10 is of the type having an inner and an outer surface, the outer surface is placed down against the sole so that the sole will be bonded to the outer surface. With all of the components in a flat condition, the cover plate 32 is brought down over the blank upper 10, the heating elements are energized at a temperature and for a period sufficient to mold the several parts together. After the molding operation has been completed, the upper with the attached sole is stripped from the platen and the free marginal edges of the upper folded and sewn to produce the finished shoe shown in FIG. 6. No lasts are required for the sewing operations since the sole is attached and the shoe outline is established by the sole molding operation.

In place of the sole composition described, others may also be used. For example, a pre-cut solid rubber sole may be employed and bonded directly to the blank upper by molding in the device shown. Certain types of foaming plastic materials which expand under the action of applied heat may also be used to advantage either alone or in conjunction with a hard-wearing tread surface. In addition, discrete particles of elastomeric materials may be poured into the die cavity in place of the pre-cut stratum 16. Such particles would be fused or expanded and fused and bonded to the upper blank or the upper blank and pre-cut tread surface by the application of heat.

In a modification of the invention, a sole is applied to a flat upper by an injection molding process which produces a shoe having a smooth finished appearance throughout. In the modified shoe forming method, the upper blank 10 is perforated at 42 and 44 corresponding to the toe and heel portion of the finished shoe and adapted to register with the openings 36 and 38 when the upper blank is applied to the mold as suggested in FIG. 7. As before, the upper blank is placed in position with the outer or wearing surface facing down and being supported by the upper edges of the die 24. With the blank upper in position, the cover 32 is closed down over the platen 20 and a suitable liquid elastomeric material, such as plastisol or the like, is injected under pressure through a conduit 46 connected to the opening 38 so that the material passes through the cover and the upper perforation 44 into the die cavity 26. The injected material thus enters the cavity at the heel portion and advances forwardly towards the toe portion. The cavity is vented during this process through the perforation 42 and the opening 36. When the cavity is completely filled, the plastic will sprue out slightly through the plate opening 36 and the injection will be stopped. The heated platen and cover will cause the material to cure and to produce a firm bond between the now molded sole and the flat upper blank 10. Once the sole is fully set, the mold is opened and the assembled parts stripped from the die. As before the upper is then folded and sewn into a finished shoe and a sock liner is applied over the insole to conceal the perforations 42 and 44.

By forming the sole in this fashion, none of the usual irregularities appear on the sole as is the case when injection is made from a point along the edge of the sole. Also there is no uneven bulge or other irregularity which may be discomforting to the wearer.

While the invention has been described with particular reference to the illustrated embodiments, it will be understood that numerous modifications thereto will appear to those skilled in the art. For example, a wide range of materials are available for either the upper or for the sole. Also the sole may be a one-piece affairs or a composite lamination comprising various types of tread surfaces and various types of cushioning layers. Further, it will be understood that shoes made according to this method may be fabricated in a wide range of sizes and shapes at a very low cost. Different size dies may be readily attached to the platen and, since lasts are not required for the building of the shoe, shoe manufacturing operations may be commenced with a relatively low initial investment. Accordingly, it will be understood that the above description and accompanying drawings should be taken as illustrative of the invention and not in a limiting sense.

Having thus described the invention, what I claim and desire to obtain by Letters Patent of the United States is:

1. The method of fabricating a shoe comprising the steps of:
    (a) forming a flat upper blank,
    (b) perforating said blank in the toe and heel portions thereof,
    (c) placing said blank over a die cavity,
    (d) injecting a liquid elastomeric material through one of said perforations while said blank is maintained in a generally flat condition and venting said cavity through the other perforation,
    (e) heating said material sufficiently to cure it, and,
    (f) folding and sewing the portions of said blank not molded to the sole into a contoured shoe upper having a foot-receiving configuration.

2. Apparatus for applying a molded tread member to a generally flat upper blank comprising:
    (a) a die formed with a cavity the shape of a sole and having a generally flat surface extending about the marginal edges thereof,
    (b) means for heating said die,
    (c) a cover hinged to said die and having a flat surface for spanning said cavity and said marginal edges, and,
    (d) adjustably mounted shoulder means mounted about said die for positioning a blank placed on said die.

3. The method of applying an elastomeric tread member to a flat blank of a shoe upper having an inner sole attached thereto, comprising the steps of:
    (a) forming at least two spaced openings through said sole and upper,
    (b) placing said sole and upper flatwise over a die cavity,
    (c) injecting a liquid elastomeric material through one of said openings and venting said cavity through the other opening, and
    (d) heating said material sufficiently to cure it.

References Cited

UNITED STATES PATENTS

| | | | |
|---|---|---|---|
| 1,654,001 | 12/1927 | Howard | 18—42 |
| 2,428,664 | 10/1947 | Gregg | 18—42 |
| 2,487,866 | 11/1949 | Gregg | 18—42 |
| 2,764,768 | 10/1956 | Ashley et al. | 264—244 X |
| 2,994,920 | 8/1961 | Patera | 264—244 X |
| 3,160,921 | 12/1964 | Ludwig | 264—244 X |
| 3,172,162 | 3/1965 | Senfleben | 18—42 |

FOREIGN PATENTS

| | | |
|---|---|---|
| 109,421 | 12/1939 | Australia. |
| 533,990 | 10/1955 | Italy. |

ROBERT F. WHITE, *Primary Examiner.*

L. S. SQUIRES, T. J. CARVIS, *Assistant Examiners.*